(12) United States Patent
Lehmann et al.

(10) Patent No.: US 10,767,618 B2
(45) Date of Patent: Sep. 8, 2020

(54) SUBMERGED WAVE ENERGY CONVERTER FOR SHALLOW AND DEEP WATER OPERATIONS

(71) Applicant: The Regents of The University of California, Oakland, CA (US)

(72) Inventors: Marcus Lehmann, Berkeley, CA (US); Mohammed-Reza Alam, Berkeley, CA (US); Thomas Boerner, Berkeley, CA (US); Nigel Kojimoto, Berkeley, CA (US); Bryan Murray, Berkeley, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 16/095,922

(22) PCT Filed: Apr. 24, 2017

(86) PCT No.: PCT/US2017/029195
§ 371 (c)(1),
(2) Date: Oct. 23, 2018

(87) PCT Pub. No.: WO2017/189455
PCT Pub. Date: Nov. 2, 2017

(65) Prior Publication Data
US 2019/0145373 A1    May 16, 2019

Related U.S. Application Data

(60) Provisional application No. 62/326,814, filed on Apr. 24, 2016.

(51) Int. Cl.
*F03B 13/20*    (2006.01)
*F03B 13/14*    (2006.01)

(52) U.S. Cl.
CPC ............ *F03B 13/20* (2013.01); *F03B 13/148* (2013.01); *F05B 2210/11* (2013.01);
(Continued)

(58) Field of Classification Search
CPC ......... F03B 13/20; F03B 13/148; Y02E 10/38
(Continued)

(56) References Cited

U.S. PATENT DOCUMENTS

| 2,109,173 | A | 2/1938 | Herndon et al. |
| 4,404,503 | A | 9/1983 | Ward et al. |

(Continued)

FOREIGN PATENT DOCUMENTS

| EP | 2 162 617 B1 | 8/2012 |
| GB | 191109231 A | 5/1911 |

(Continued)

OTHER PUBLICATIONS

International Search Report and Written Opinion, dated Oct. 8, 2018 (20 pages).
(Continued)

*Primary Examiner* — Pedro J Cuevas
(74) *Attorney, Agent, or Firm* — Sterne, Kessler, Goldstein & Fox P.L.L.C.

(57) ABSTRACT

A submerged wave energy conversion apparatus and pressurized fluid or electricity production system are provided that harvests energy from a motive force derived from pressure differentials created by the interaction of the system with ocean water. The system is capable of capturing energy from up to six different modes of motion of the absorber body in response to the energy of incident waves. The apparatus has an absorber body that is attached to one or more damping mechanisms like a hydraulic cylinder, a hydraulic circuit that can create useful mechanical torque, a restoring mechanism such as an air spring to restore the
(Continued)

absorber system to stable equilibrium, and a buoyant artificial floor to create an opposing reaction force. The apparatus may also have a controller for system monitoring and control, to maintain optimized energy extraction, and for load management to avoid damaging loads.

15 Claims, 7 Drawing Sheets

(52) U.S. Cl.
CPC ..... *F05B 2210/40* (2013.01); *F05B 2260/406* (2013.01); *F05B 2270/18* (2013.01); *F05B 2270/301* (2013.01); *Y02E 10/38* (2013.01)

(58) Field of Classification Search
USPC ............... 290/42, 53; 60/495, 496, 501–509
See application file for complete search history.

(56) References Cited

U.S. PATENT DOCUMENTS

| | | | | |
|---|---|---|---|---|
| 4,408,454 A * | 10/1983 | Hagen | ............... | F03B 13/1815 417/331 |
| 4,490,621 A | 12/1984 | Watabe et al. | | |
| 4,698,969 A * | 10/1987 | Raichlen | ............... | F03B 13/187 210/121 |
| 4,754,157 A * | 6/1988 | Windle | ................ | F03B 13/189 290/42 |
| 4,868,408 A | 9/1989 | Hesh | | |
| 5,548,177 A * | 8/1996 | Carroll | .................... | H02N 2/18 290/53 |
| 6,229,225 B1 | 5/2001 | Carroll | | |
| 6,291,904 B1 | 9/2001 | Carroll | | |
| 6,392,314 B1 * | 5/2002 | Dick | ..................... | F03B 13/148 290/53 |
| 6,617,705 B1 * | 9/2003 | Smalser | ............. | F03B 13/1855 290/42 |
| 6,731,019 B2 * | 5/2004 | Burns | ................... | F03B 13/148 290/42 |
| 6,756,695 B2 * | 6/2004 | Hibbs | ................... | F03B 13/183 290/42 |
| 6,768,216 B1 * | 7/2004 | Carroll | ................. | F03B 13/148 290/42 |
| 6,768,217 B2 * | 7/2004 | Chalmers | ............. | F03B 13/148 290/53 |
| 6,772,592 B2 * | 8/2004 | Gerber | ............... | F03B 13/1845 290/53 |
| 6,812,588 B1 * | 11/2004 | Zadig | ................... | F03B 13/187 290/53 |
| 6,933,623 B2 * | 8/2005 | Carroll | ................. | F03B 13/148 290/42 |
| 6,935,808 B1 | 8/2005 | Dempster | ............... | B63B 35/44 405/28 |
| 7,140,180 B2 * | 11/2006 | Gerber | ............... | F03B 13/1845 60/496 |
| 7,141,888 B2 * | 11/2006 | Sabol | ..................... | B60L 7/003 290/53 |
| 7,168,532 B2 * | 1/2007 | Stewart | ................... | B60L 7/003 188/161 |
| 7,298,054 B2 * | 11/2007 | Hirsch | ................ | F03B 13/1845 290/42 |
| 7,305,823 B2 * | 12/2007 | Stewart | .............. | F03B 13/1845 60/495 |
| 7,310,944 B2 * | 12/2007 | Sabol | ..................... | B60L 7/003 60/495 |
| 7,323,790 B2 * | 1/2008 | Taylor | ................. | F03B 13/1895 290/42 |
| 7,348,764 B2 * | 3/2008 | Stewart | ..................... | H02P 9/48 322/24 |
| 7,443,046 B2 * | 10/2008 | Stewart | .................. | F03B 13/20 290/42 |
| 7,476,137 B2 * | 1/2009 | Stewart | ............... | F03B 13/1815 290/42 |
| 7,498,685 B2 * | 3/2009 | Turner | ................ | F03B 13/1845 290/42 |
| 7,594,780 B2 * | 9/2009 | Bull | .................... | B63B 35/4406 405/195.1 |
| 7,658,067 B2 * | 2/2010 | Gerber | .................... | F03B 13/20 60/496 |
| 7,816,797 B2 * | 10/2010 | Nair | ...................... | H01L 41/125 290/42 |
| 7,877,994 B2 * | 2/2011 | Bull | .................... | B63B 35/4406 60/495 |
| 7,878,734 B2 * | 2/2011 | Bull | .................... | B63B 35/4406 405/76 |
| 7,886,680 B2 * | 2/2011 | Draper | .................... | B63B 21/50 114/230.1 |
| 7,964,977 B2 * | 6/2011 | Nair | ...................... | H01L 41/125 290/42 |
| 7,980,832 B2 * | 7/2011 | Ahdoot | ................. | F03B 13/182 290/42 |
| 8,093,736 B2 * | 1/2012 | Raftery | ................ | F03B 13/1885 290/42 |
| 8,253,263 B2 | 8/2012 | Atilano et al. | | |
| 8,629,572 B1 * | 1/2014 | Phillips | ................... | F03B 13/16 290/53 |
| 8,943,821 B2 * | 2/2015 | Hagemann | .......... | F03B 13/1825 60/496 |
| 8,946,919 B2 * | 2/2015 | Phillips | ................... | F03B 13/16 290/53 |
| 8,946,920 B2 * | 2/2015 | Phillips | ................... | F03B 13/16 290/53 |
| 8,952,560 B2 * | 2/2015 | Phillips | ................... | F03B 13/16 290/53 |
| 8,963,358 B2 * | 2/2015 | Phillips | ................... | F03B 13/16 290/53 |
| 9,476,400 B2 * | 10/2016 | Phillips | ................... | F03B 13/16 |
| 9,541,054 B2 * | 1/2017 | You | ...................... | F03B 13/189 |
| 9,624,900 B2 * | 4/2017 | Phillips | ................... | F03B 13/20 |
| 9,644,601 B2 * | 5/2017 | Phillips | ................... | F03B 13/16 |
| 9,777,701 B2 * | 10/2017 | Alam | .................... | F03B 13/187 |
| 10,011,910 B2 * | 7/2018 | Phillips | ................... | C25B 15/08 |
| 10,047,717 B1 * | 8/2018 | Phillips | ............... | H02K 7/1892 |
| 10,190,568 B2 * | 1/2019 | Gregory | ................ | F03B 13/1895 |
| 10,240,575 B2 * | 3/2019 | Dragic | ................ | F03B 13/1855 |
| 10,253,747 B2 * | 4/2019 | Shepsis | ................... | F03B 13/20 |
| 2002/0047273 A1 * | 4/2002 | Burns | ................... | F03B 13/148 290/53 |
| 2003/0193197 A1 * | 10/2003 | Hibbs | ................... | F03B 13/183 290/53 |
| 2005/0084333 A1 * | 4/2005 | Zadig | ................... | F03B 13/187 405/79 |
| 2006/0208839 A1 * | 9/2006 | Taylor | ................ | F03B 13/1895 335/205 |
| 2007/0126239 A1 | 6/2007 | Stewart et al. | | |
| 2007/0164568 A1 * | 7/2007 | Greenspan | .......... | F03B 13/1865 290/53 |
| 2007/0228737 A1 * | 10/2007 | Hirsch | ................ | F03B 13/1845 290/42 |
| 2008/0260548 A1 * | 10/2008 | Ahdoot | ................. | F03B 13/182 417/333 |
| 2008/0309088 A1 * | 12/2008 | Agamloh | ............ | F03B 13/1845 290/53 |
| 2009/0066085 A1 * | 3/2009 | Gray | ...................... | F03B 13/20 290/42 |
| 2009/0085357 A1 | 4/2009 | Stewart | | |
| 2009/0121486 A1 * | 5/2009 | Ganley | ................. | F03B 13/262 290/53 |
| 2010/0133843 A1 * | 6/2010 | Nair | ...................... | H01L 41/125 290/53 |
| 2010/0148504 A1 | 6/2010 | Gerber | | |
| 2010/0171311 A1 * | 7/2010 | Eckart | .................. | B01D 61/025 290/53 |
| 2011/0012358 A1 * | 1/2011 | Brewster | ............. | F03B 13/1885 290/53 |
| 2011/0062713 A1 | 3/2011 | Ardoise et al. | | |
| 2011/0074160 A1 * | 3/2011 | Chua | ................ | F03B 13/1815 290/53 |
| 2011/0084488 A1 | 4/2011 | Eder et al. | | |

(56) References Cited

U.S. PATENT DOCUMENTS

| | | | |
|---|---|---|---|
| 2011/0089697 A1* | 4/2011 | Nair | H01L 41/125 290/53 |
| 2011/0133463 A1* | 6/2011 | Nair | H01L 41/125 290/53 |
| 2012/0247098 A1 | 10/2012 | Stewart | |
| 2013/0031897 A1* | 2/2013 | Hagemann | F03B 13/20 60/505 |
| 2013/0034454 A1 | 2/2013 | Smith | |
| 2013/0127168 A1* | 5/2013 | Dragic | F03B 13/1855 290/53 |
| 2014/0117673 A1* | 5/2014 | Phillips | F03B 13/16 290/53 |
| 2014/0117674 A1* | 5/2014 | Phillips | F03B 13/16 290/53 |
| 2014/0138958 A1 | 5/2014 | Verdegem | |
| 2014/0313001 A1* | 10/2014 | Phillips | F03B 13/16 335/306 |
| 2014/0339928 A1* | 11/2014 | Phillips | F03B 13/16 310/30 |
| 2015/0063910 A1 | 3/2015 | Meltsov et al. | |
| 2015/0145258 A1* | 5/2015 | Phillips | F03B 13/16 290/53 |
| 2016/0010619 A1* | 1/2016 | Phillips | F03B 13/16 290/53 |
| 2016/0108883 A1* | 4/2016 | Alam | F03B 13/187 60/505 |
| 2016/0186715 A1* | 6/2016 | Fait | F03B 13/20 290/53 |
| 2016/0252071 A1* | 9/2016 | Phillips | F03B 13/20 290/50 |
| 2017/0198401 A1* | 7/2017 | Phillips | H02K 7/1853 |
| 2018/0306164 A1* | 10/2018 | Lehmann | F03B 13/187 |
| 2019/0085817 A1* | 3/2019 | Fait | F03B 13/20 |
| 2019/0285044 A1* | 9/2019 | Dragic | F03B 13/186 |
| 2019/0315595 A1* | 10/2019 | Hattori | B66B 7/028 |

FOREIGN PATENT DOCUMENTS

| | | |
|---|---|---|
| RU | 2 568 012 C1 | 11/2015 |
| WO | WO 2008/065684 A1 | 6/2008 |
| WO | WO 2013/182837 A1 | 12/2013 |

OTHER PUBLICATIONS

International Search Report and Written Opinion, dated Jul. 27, 2017 (8 pages).

* cited by examiner

SUBMERGED WAVE ENERGY CONVERTER FOR SHALLOW AND DEEP WATER OPERATIONS

CROSS-REFERENCE TO RELATED APPLICATIONS

The present patent claims priority to, and the benefit of, U.S. provisional patent application Ser. No. 62/326,814 filed on Apr. 24, 2016, which is incorporated herein by reference in its entirety.

BACKGROUND

1. Technical Field

The technology of this disclosure pertains generally to renewable electricity generation, and more particularly to wave energy extraction system and platform using an absorber carpet actuating one or more energy converters.

2. Background Discussion

The oceans of the world have long been recognized as a potential continuous and abundant source of natural mechanical energy. Increasing global demand for electricity and the need for alternatives to fossil fuel production make harnessing wave energy to produce electricity an attractive endeavor. Energy from the ocean could help to relieve the electricity generation load in many heavily populated regions of the world as well as to reduce the volume of environmentally harmful emissions.

However, successful harvesting of energy from waves for conversion into electrical energy has been generally limited to small scale applications, and few existing systems are capable of providing electricity to established power grids. There are a number of reasons for the lack of utilization of wave energy in spite of over 200 years of innovations. One significant reason for the slow utilization of the available energy from the oceans is the damage and destruction that can occur to generating devices from exposure to wave energy from storms, rogue waves and exposure to a high salt marine environment. Many conventional wave energy converters extract power from the surface of the ocean and must be engineered to survive the power of the harshest ocean storms, which increases the design complexity as well as capital costs.

In addition to being unable to withstand rough weather, the performance of many generating devices will drop significantly during rough weather. Surface wave energy converters rely on regular and consistent wave formation using vertical motion (heave) to convert the wave energy and rely on the shape of the incident wave. Irregular wave behavior during storms or areas without a consistent flow of powerful waves results in power generation that is unpredictable and erratic and therefore unsuitable as a source for existing power grids. Other surface wave energy converters produce highly distorted power due to the reciprocal motion induced by the ocean waves.

Wave energy converters may also be location limited. Surface devices may interfere with the activity of commercial and private vessels and therefore cannot be placed in shipping lanes. Generating systems must also be in close proximity to the shore because it is difficult to transfer generated energy a great distance from the shore. Therefore, wave energy is not a viable power source in all settings because of the location of generation.

Capital costs, maintenance costs and repair costs have been another barrier to widespread installation of fields of wave energy converters. The useful lifetime, reliability and maintenance requirements of wave energy devices are important economic factors considered in such electrical generation investments. Devices that frequently break down produce unacceptable electricity production losses, income losses and increased operational costs. Furthermore, as the demand for renewable energy technologies increases, the cost of investment and construction of wave energy extraction generating systems and devices is expected to decrease.

Successful harvesting of energy from waves for conversion into electrical energy has also been problematic because the power quality that is produced by these devices is poor due to the sinusoidal velocity of the power generating structures as a result of the sinusoidal shape of the incoming ocean wave. Consequently, the generator is not able to operate at a constant speed for optimum efficiency. Rather, the output power is continuously fluctuating from zero to a peak and back in every wave where the device absorber linkage is directly connected to its generator.

Although devices for extracting wave energy to perform work in some form have been developed since the 1700's, only a few full scale wave energy projects have been constructed. Wave energy technologies that have been developed tend to be variations of three general schemes: wave capture devices, oscillating water column devices and wave profile devices.

Wave capture devices such as overtopping or channeling structures funnel wave water into a reservoir that is above sea level and that water is then drained through a reaction turbine back to the sea. The energy of the wave is converted into potential energy which is captured by the turbine to generate electricity.

Oscillating water column devices convert wave energy or wave surge energy into pressurized air that is channeled through a turbine to generate electricity. These schemes utilize a hollow structure that is exposed to the sea on one end and contains a column of air. The movement of the water into the structure compresses the air in the structure that drives the turbine. The receding water within the housing draws air back into the structure usually back through the turbine.

Wave profile devices use the changing height of the surface of the ocean or variations in pressure under the surface of the water with the progression of the wave to create mechanical energy. Point absorber wave profile energy converters typically have a buoy floating on the surface of the water that is connected to a fixed deadweight or to a heave plate that is suspended below the buoy as well as to a pump or generator. The vertical motion of the wave causes the buoy to move with respect the heave plate activating a pump or generator.

Attenuator wave profile devices are elongated segmented devices that ride on the surface of the water and are oriented parallel to the direction of the waves. The segments are separated with hydraulic ram joints. The waves cause the segments to articulate and the hydraulic pistons pressurize hydraulic fluid ultimately spinning an electric generator.

Accordingly, there is a need for a reliable way to harness wave power to produce electrical energy in remote marine environments that is efficient, easy to maintain and low in cost.

BRIEF SUMMARY

The present technology provides a system and apparatus framework for the efficient conversion of energy from open ocean swells and waves to electric power. The system harvests energy from motive forces derived from pressure differentials created by the interaction of the system beneath the surface of the water.

To avoid the large structural stresses that are produced by the slamming forces of breaking waves on floating structures, the apparatus is stationed below the surface and exploits the pressure differences on the apparatus produced by wave crests and troughs. Furthermore, because the apparatus is fully submerged, apparatus arrays will not interfere with surface activities such as shipping and will not have any visual impact.

Contrary to appearances, deep water ocean waves do not move any net volume of water in the direction of travel towards the shore. Waves are the movement of energy rather than the movement of water. On the molecular level, water moves in a circular orbital path with movements that decrease exponentially in intensity with depth. The system and apparatus converts the energy of the circular water movements to mechanical work and ultimately to electrical current.

The majority of wave energy converter designs in the art attempt to harness the wave energy by using waves to induce a relative displacement between two rigid bodies, such as a buoy and a subsurface base. The displacement is work that is converted to other usable forms of energy. Unlike most existing converter designs that focus on only one mode of body motion, the present technology is capable of capturing energy from up to six different modes of motion of a body in response to the energy of incident waves. There are essentially three reciprocating motions and three rotational motions that a body subject to ocean waves will produce. The reciprocating motions include: 1) heave or heaving (vertical reciprocating motion of an object); 2) surge or surging (horizontal, longitudinal motion); and 3) sway or swaying (horizontal lateral motion of an object). The rotation motions of a floating object include: 1) pitch or pitching (rotational motion around a lateral axis of the object); 2) roll or rolling (rotational motion around the longitudinal axis of the object); and 3) yaw or yawing (rotational motion around the vertical axis through the center of gravity). Since most of the existing technologies focus only on either heave or surge, there is no recovery of energy from the other modes of motion.

The wave energy converter system and apparatus works in three stages to convert wave energy to electrical energy. The first stage is the part of the apparatus that interacts directly with the wave energy. This interface is preferably an absorber body that has a top surface that is oriented parallel or at a slight angle to the ocean surface that interacts and captures the wave energy. The first stage of the energy converter is the stage that is responsible for capturing the maximum energy possible from the incoming waves and the remaining stages are responsible for processing that captured energy.

The second stage of the energy converter is a power take off (PTO) system that is coupled to the absorber body to convert displacement of the first stage interface into other usable forms of energy. The power take off (PTO) system preferably includes a power conversion chain subsystem that generally comprises one or more damping elements such as hydraulic cylinders feeding into a fluid (hydraulic, water or air) supply line.

The third stage of the wave energy conversion system generates electricity from the pressurized fluid that is produced by the power take off system. A hydraulic PTO system is preferred because hydraulic systems are very well suited to converting reciprocating high force, slow oscillating motion of the wave energy converter to rotary motion needed to drive an electrical generator.

In one embodiment, the preferred wave energy harvesting system includes: (1) at least one submerged body structure with horizontally oriented absorber surface that is excited by a pressure differential of the surrounding water; (2) a power take-off system with a power conversion chain (PCC) including one or more damping elements, preferably hydraulic cylinders; (3) a restoring force mechanism such mechanical springs, air springs and/or buoyancy, and (4) a reaction support frame.

In one embodiment, the system includes a rigid submerged body which creates a pressure differential by splitting the particle motion patterns induced by ocean waves. The absorber is attached to damping elements that feed a closed hydraulic circuit which creates a useful mechanical torque, one or more air springs to restore the absorber to a stable equilibrium, and a buoyant artificial floor to create an opposing reaction force.

The absorber platform of the converter moves with respect to a fully or partially fixed reference. In one embodiment, for deep sea applications the reference can be a buoyant base and in shallow water applications the base may be fixed to a pedestal or stand that is anchored to the sea floor. One or more constant or variable, single or double acting, damping and restoring force mechanisms may be connected to the absorber platform to extract energy and return the absorber to a starting position after being compressed toward or extended from the base by wave pressure. Preferably the performance behavior of the damping and restoring force mechanisms is capable of being adjusted and the mechanisms can be actuated and/or controlled independently.

The absorber is a rigid, semi-rigid, or flexible body that is capable of extracting energy from water waves by surge, heave, pitch, roll, yaw, and/or sway motion and excitation. In one embodiment, the absorber comprises reinforced steel or fiberglass such as a common water-entrapment plate used in offshore engineering supported by a truss or beam structure.

The main function of the areal absorber is to prevent pressure exchange between the top and bottom surfaces of the absorber, resulting in a positive and negative alternating irregular sinusoidal load, normal to the absorber area plane, which excites and displaces the absorber. In one embodiment, winglet-like extensions may be attached to the absorber edges in the direction of wave propagation to prevent neutralization of the dynamic pressure difference. The second function of the absorber is to distribute the area load to the point loads applied on the absorber by the bearing points that connect and mount the absorber to the damping elements (e.g. cylinders).

The hydraulic Power Conversion Chain (PCC) should be capable of up-converting a large, reciprocating mechanical force with a slow linear velocity into a constant mechanical torque that can be used by a generator to produce electricity for consumers. The conversion chain should also be capable of rectifying and smoothing the irregular input of a hydraulic cylinder to a steady pressure and flux. In addition, the accumulators of the PCC can act as an internal energy storage for power input smoothing as well as to provide energy storage that can be used in response to consumer demand from the electrical power grid. The conversion chain can also provide protection from overload or shock loads by altering the path of the hydraulic circuits.

The power conversion chain of the system preferably comprises one or multiple single or double acting damping elements acting as a power take-off system for extracting energy from the absorber. These damping elements may be actuated and/or excited independently and individually adjusted in their damping characteristics. The preferred power conversion chain comprises four hydraulic cylinders feeding into a hydraulic supply line. The damping elements may also power a linear generator or a mechanical system to convert linear motion to rotary motion such as a rack and pinion lead screw. In one embodiment, the actuated cylinders supply a hydraulic accumulator, which flattens the output flow and maintains a relatively constant pressure and the system also drives a set of hydraulic motor-generators to generate electricity. Accumulators, control valves, hydraulic motors, electrical generators, and connection to an umbilical may be in two enclosures within a support frame.

The base support frame provides a mount for the lead and back edges of the absorber, the hydraulic cylinders, and an enclosure that houses the rest of the PCC elements. The base frame is also connected to a mooring platform. Mechanical joints such as spherical bearings may be used to connect the absorber to the four shafts of hydraulic cylinders and on the other end to mount the four cylinder bodies to the reaction frame.

A ballast system may be connected to the frame to provide a buoyant base. Preferably, the frame houses a ballasting system that can apply a buoyancy lift force to the frame that exceeds the total mass of the device and the loads and moments induced by the damping elements and overpassing waves. In one embodiment, the ballast system provides buoyancy of up to 1.2 times the sum of the total mass of the system and the specified highest vertical downward wave force.

The position of the apparatus in the water column and placement in the selected geographical location are determined with a mooring system. There are many mooring systems in the art that can be used to provide the reaction forces to ensure stability of the frame. In one preferred embodiment, the mooring lines of the system connect a lock winch, gearbox, generator/motor and controller to anchors in the seabed. In an alternative embodiment, the relative position of the apparatus can be controlled and electrical current can be generated with the increase in line tension from apparatus movement due to heave and other forces.

Each of the mooring elements is preferably coupled directly to the frame with a mooring lock winch covered in an enclosure. In one preferred embodiment, four diagonal taut mooring lines are connected to anchors embedded in the seabed to secure the frame in the buoyant operating mode. Anchors that provide better uplift than e.g. dead-weight anchors, such as directed embedment, vertical load anchors, driven or suction piles are preferred.

Various chambers of the ballasting system can also be regularly or continuously adjusted individually to secure tension in the taut moorings and stabilize the frame during installation, operation and maintenance. The cracking pressure of pressure relief valves embedded in the absorber body can be selected to cut off the peak loads that are considered the calculation of the required ballasting volume.

In one preferred embodiment, anchor chains are connected to a neutrally buoyant polyester rope that has a suitable minimum breaking load (MBL). The length of the rope can vary depending on the local bottom slope. This mooring configuration limits vertical motion in all directions of the horizontal plane, resists current induced lateral motion, and provides the requisite downward opposing force to the buoyant apparatus. The top end of the mooring can be connected to a winch and stopper that can adjust the mooring length between the connection point and the mooring winch. Depending on site-specific safety requirements, one single line per corner might be insufficient. Alternatively, additional line(s) can be added.

A process control sub-system may optionally be provided for controlling the operating behavior of a wave energy converter by utilizing passive and active mechanisms in order to improve performance and maximize annual energy production while reducing peak excitation load on the absorber, damping elements, reaction frame, mooring lines and anchors. For example, the system may provide computerized control sub-systems for managing the time-varying and spatially-varying loads on the apparatus to maintain an optimized energy extraction operation and to avoid infrequent damaging loads. A load management sub-system can minimize structural loads on the wave absorbing structure and on the power converting mechanism such as joints, PTO components, etc. including management of peak loads during operations as well as peak loads during extreme events such as storm waves.

In one embodiment, the wave load management mechanism is capable of increasing or decreasing wave excitation load on the primary absorber structure through shortcutting and thus cancelling of local pressure differential above and underneath the absorber using one or more passive and active apertures embedded in the absorber. The load management subsystem may also be configured for hydrodynamic tuning through adjustments of the natural frequency of the primary absorber through coupled, optimized control of the hydrodynamic properties of added mass and/or operating depth.

The control sub-systems can also control the flow conditions of pressurized fluid through the hydraulic cylinders and hydraulic circuits to the generators as well as control the electrical generation system that can take place on shore or on the apparatus offshore.

Once assembled, the wave energy converter apparatus can be transported to a designated location for installation and deployment. The apparatus can be temporarily coupled with a service vessel and isolated compartments can be flooded or ballasted to add stability for towing operations. A locking mechanism that mechanically constrains the two body floaters to one form combined hydrodynamic body can be provided to assist in the installation, maintenance and decommissioning of the apparatus. The damping elements can be actively contracted to approximate absorber and reaction frame enabling the lock mechanism. Alternatively, the ballast system in the absorber or an independent mechanism such as a chain winch can be used to locate absorber to the frame allowing the lock mechanism to function.

Accessing a wave energy converter for regular maintenance can be accomplished by flooding or ballasting isolated compartments to create a stable working platform for maintenance access on the surface. The fully buoyant apparatus can also be coupled or mated with a service vessel to create a stable working platform. Optionally, parts or subsystems of the apparatus, including the entire absorber and PTO assembly, can be disconnected from the buoyant platform for recovery, maintenance, or servicing in a submerged, or partially submerged state The wave energy converter devices may also be placed in a farm configuration where they are positioned in a direction to capture the average dominant swell of the waves. For example, the devices can be oriented in a linear configuration with mooring points separated by sufficient distances to allow shared mooring points while avoiding wake effects and providing a safe boundary to approach individual devices from every side. Shared mooring anchors may also find material savings compared with two separate, identical anchors by exploiting phase and directional differences in loads as well.

During an extreme event such as a significant storm, each device can be lowered down with the mooring winches to the required safety operating depth for that event, and, the safety mechanism of latching the absorber platform to frame to immobilize the absorber can be applied if it becomes necessary. Other According to one aspect of the technology, a subsurface wave energy conversion apparatus and system is provided that harvests energy from ocean waves from a motive force derived from pressure differentials created by the system's interaction with ocean water.

A further aspect of the technology is to provide a simple, efficient low maintenance system with at least one submerged wave energy absorber, at least one power takeoff unit, at least one restoring force mechanism, and a reaction mechanism.

Another aspect of the technology is to provide a wave energy absorber body that can capture energy from wave generated surge, heave, sway, pitch, roll and yaw absorber body motions.

Further aspects of the technology described herein will be brought out in the following portions of the specification, wherein the detailed description is for the purpose of fully disclosing preferred embodiments of the technology without placing limitations thereon.

BRIEF DESCRIPTION OF THE SEVERAL VIEWS OF THE DRAWINGS

The technology described herein will be more fully understood by reference to the following drawings which are for illustrative purposes only.

DETAILED DESCRIPTION

Referring more specifically to the drawings, for illustrative purposes, embodiments of the apparatus and system for wave energy conversion are generally shown. Several embodiments of the technology are described generally in FIG. 1 through FIG. 8 to illustrate the apparatus and the system characteristics and functionality. It will be appreciated that the methods may vary as to the specific steps and sequence and the systems and apparatus may vary as to structural details without departing from the basic concepts as disclosed herein. The method steps are merely exemplary of the order that these steps may occur. The steps may occur in any order that is desired, such that the method still performs the goals of the claimed technology.

Figure 1A:
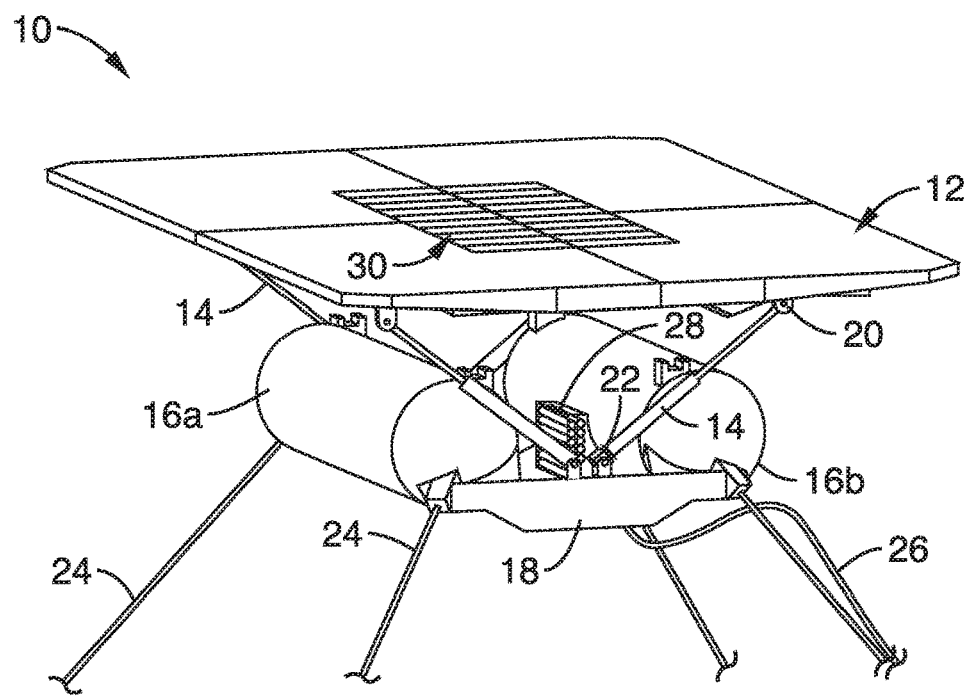
FIG. 1A is a schematic top perspective view of a wave energy converter apparatus according to one embodiment of the technology.
Figure 1B:
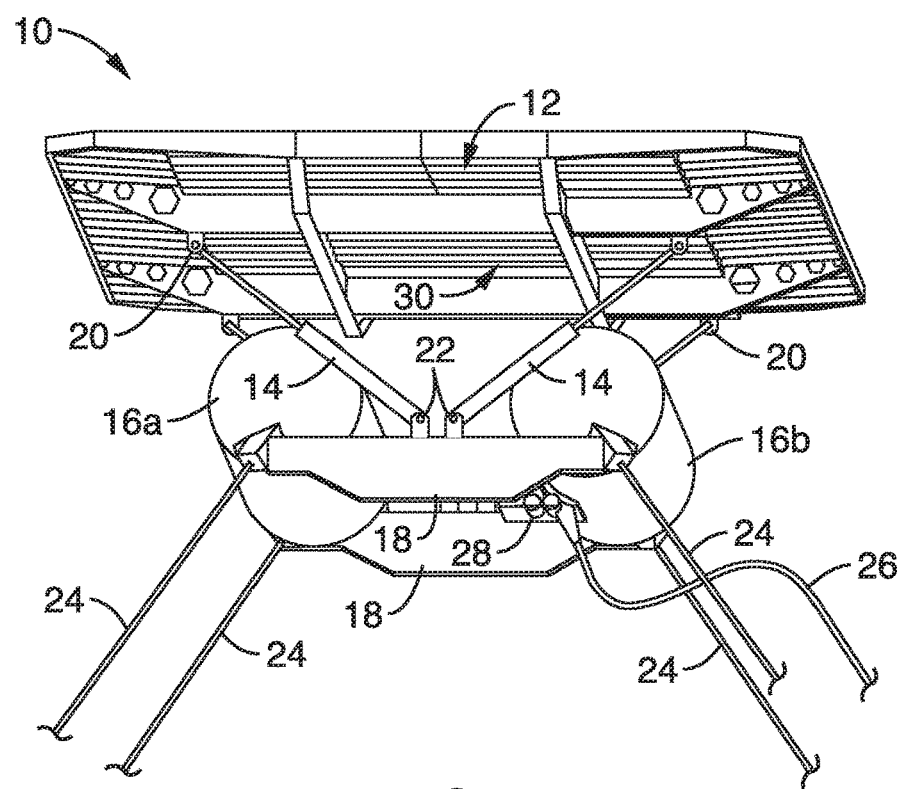
FIG. 1B is a schematic bottom perspective schematic view of a wave energy converter apparatus of FIG. 1A.

Turning now to FIG. 1A and FIG. 1B, an apparatus 10 for the conversion of energy stored in ocean waves to electricity that can be transferred to shore and fed into the grid is schematically shown.

In this illustrative system, a rigid plate "absorber" 10 is constrained to split the water particle's orbital motions induced by ocean waves, thus creating independent locally-varying and time-varying pressures above and below the absorber body 12 inducing a motive force from the local and total pressure differential. The motion is then transferred to one or more power takeoff units 14, which transform the absorber motion into a standard form of mechanical power. A restoring force is provided to ensure the absorber oscillates about a set equilibrium. A reaction mechanism is used to oppose the displacement of the power takeoff and thus transfer energy to a new mechanical form.

The apparatus 10 has two main structural elements: 1) An upper, slender, horizontally oriented absorber 12, with the main function of a fluid-structure interaction for high performance wave to mechanical energy conversion; and, 2) a lower base 18 that is responsible for providing the damping and restoring force for the absorber 12.

The body of the absorber 12 can be rigid, semi-rigid or flexible and the structure is able to extract energy from water waves by surge, heave, pitch, roll, yaw, and/or sway excitation. In one embodiment, the absorber is rectangular in shape with a 20 m by 40 m dimensions. In one embodiment, the absorber may be made out of composite of steel beams, steel or fiberglass plates and have a frame profile that is reinforced by main and minor beams and load distributing cross beams and filled with polyurethane foam to create an absorber 12 body with neutral or positive buoyancy.

The top surface of the absorber body 12 is preferably planar. However, in the top surface may also be altered in a way that induces desired drag and turbulence leading to an improved fluid structure interaction (FSI), thus energy transfer from wave to structure, respectively. This could be in a form of surface roughness or vertical bodies blocking or redirecting water flow over the surface. For example, winglet extensions may be attached to prevent neutralization of the dynamic pressure difference on the side edges of the absorber 12 in one embodiment.

The absorber 12 is excited by the dynamic pressure difference created by overpassing waves, which produces a dynamic area load on the absorber. The horizontally oriented absorber 12 horizontally splits the pressure gradient underneath incident waves, creating a pressure differential between its top and bottom side. This pressure differential leads to alternating area loads across the absorber area and ultimately to oscillating relative motion of the absorber 12 predominantly in heave, surge, and pitch Degrees of Freedom (DOF). The main function of the absorber 12 is to maximize the oscillating motion in heave, surge and pitch induced by the wave excitation load/water particle motion around the structure.

The absorber body 12 preferably integrates at least one adjustable aperture 30 that enables the short-cutting of the wave induced pressure differential occurring above and underneath the absorber body 12 resulting in a reduction in the wave excitation load and added mass. This mechanism may be controlled by means of a wave load management system for hydrodynamic resonance tuning, and for survival of the apparatus in severe seas.

The absorber body 12 and the lower base platform structure 18 are mechanically connected through four hydraulic cylinders 14 that serve as power take-off (PTO) units in the embodiment shown in FIG. 1A through FIG. 2B. Although four hydraulic cylinders 14 are preferred, it will be seen that fewer than four or more than four cylinders can be used as power take off units. The cylinders 14 can be single or double acting damping elements acting as a power take-off system extracting energy from the absorber 12. The cylinders 14 can also be individually actuated and/or excited independently and each can be adjusted in their damping characteristics.

The hydraulic cylinders 14 are connected on one end to the absorber body 12 by a joint 20 and to the lower base platform 18 on the other with joint 22, where the joints can be universal, gimbal or other type of mechanical joint providing the same degrees of freedom whit the desired reduction of degree of freedom in obtained. The placement of the hydraulic cylinders in relation to the absorber 12 and base 18 allows the absorber to predominantly operate in the surge, heave, and pitch degrees of freedom (DOF) as illustrated in FIG. 4A through FIG. 4D.

The main function of the base platform 18 is to minimize motion induced by 1) wave excitation load/water particle motion around the structure and 2) the reaction forces of the hydraulic cylinders. A secondary function of the base platform 18 is to house the hydraulic power conversion chain in a central concealed chamber including the accumulators, hydraulic motors and mechanical consumers such as a generator.

Figure 2A:
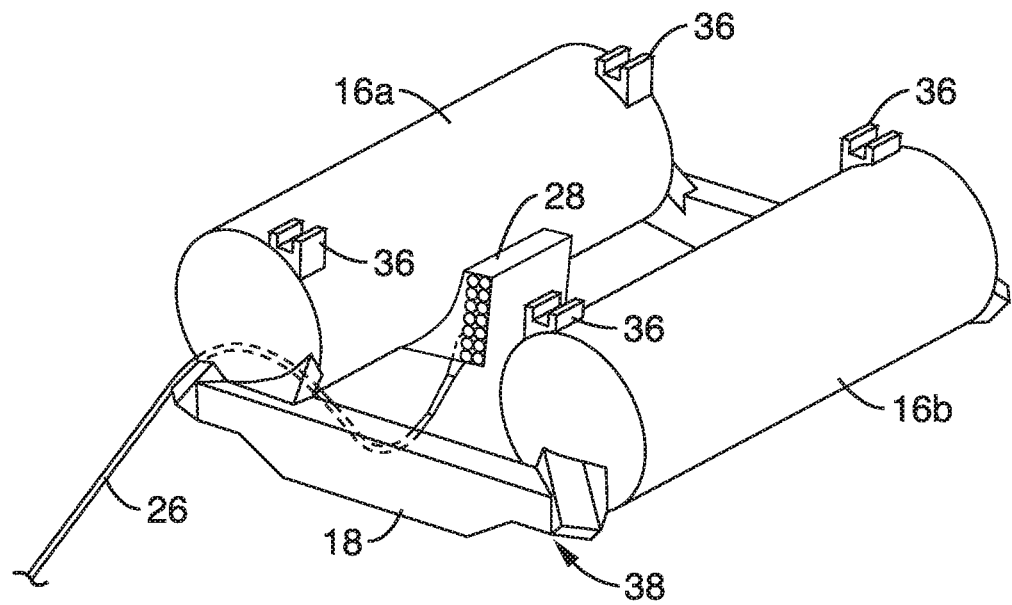
FIG. 2A is a schematic perspective view of the base platform without the absorber and power take off elements.
Figure 2B:
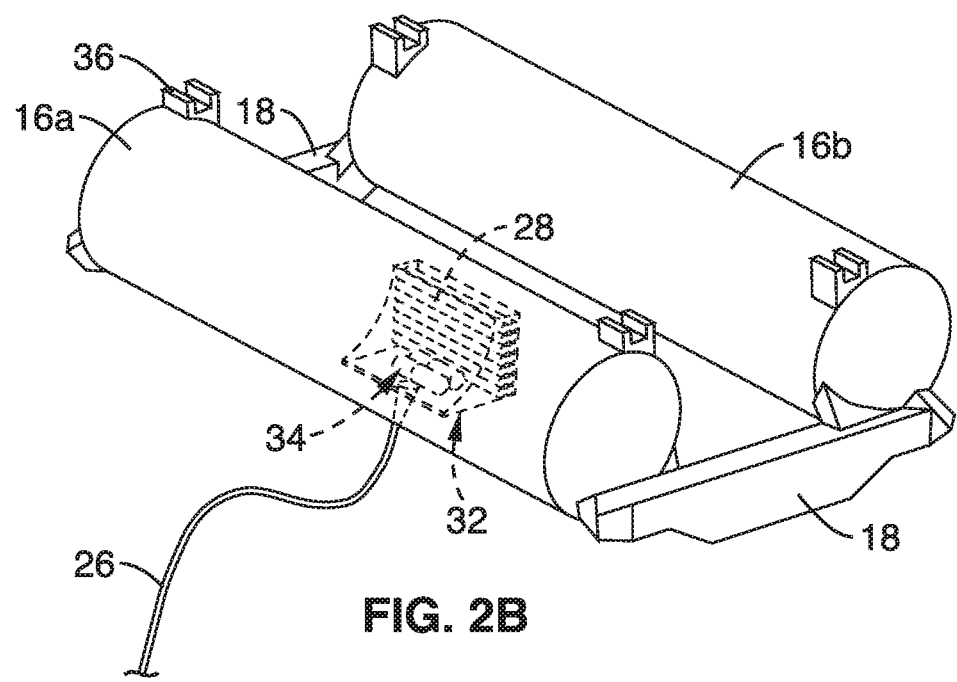
FIG. 2B is a schematic perspective schematic view of the base platform embodiment of FIG. 2A.

Referring also to FIG. 2A and FIG. 2B, the lower base platform 18 preferably comprises a set of ballast tanks 16a, 16b that provide controllable positive or negative buoyancy in the embodiment shown. Restoring forces that react to oppose the compression of the cylinders 14 are enabled by the positive buoyant ballast system 16a, 16b integrated into the platform 18.

For towing, installation and failure cases, the absorber 12 and the base platform 18 can also be mechanically locked with a locking mechanism 36, creating a hydrodynamically stable system.

Figure 3:
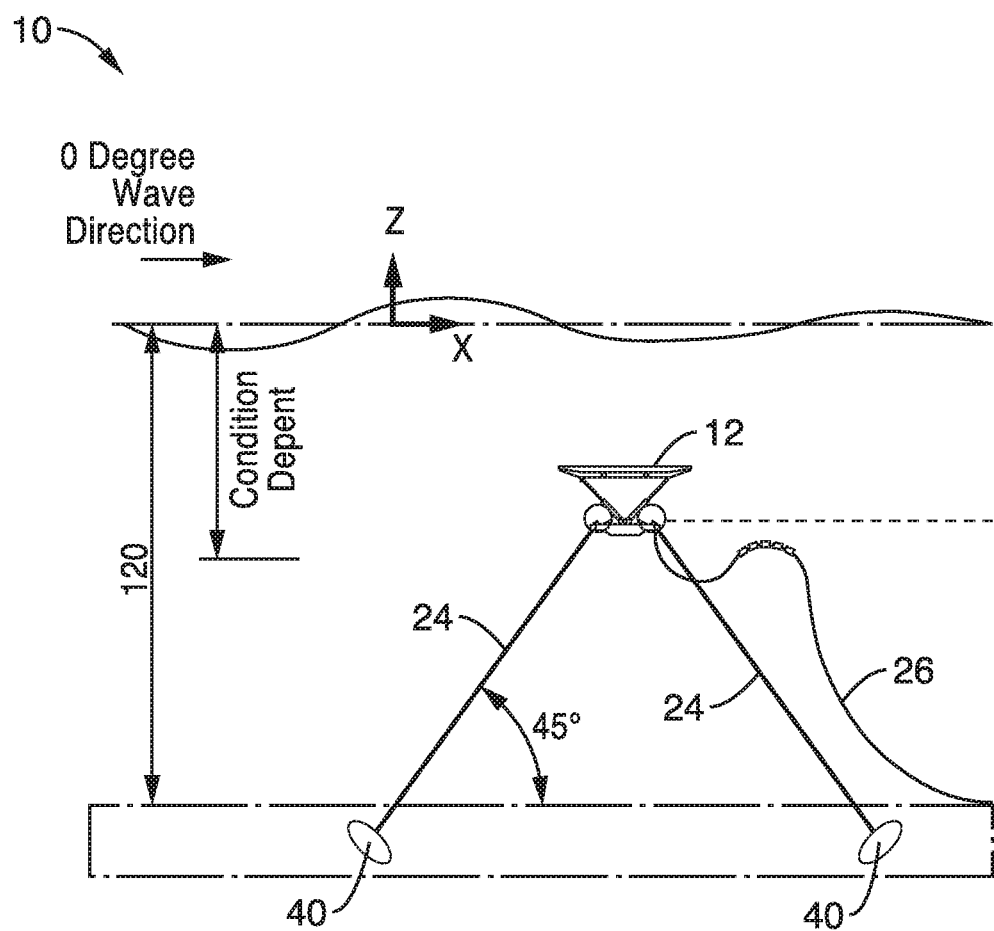
FIG. 3 is side contextual view of an installed wave energy converter apparatus positioned in a water column.

The platform 18 provides the reaction forces for extending PTO units through four taut mooring lines 24 into vertical load anchors 40 that are embedded in the seafloor as shown in FIG. 3. The four corners of the platform 18 house winches 38 that are connected to the taut mooring lines 24 that are spread out diagonally and connect to vertical load anchors 40. All mooring lines 24 are preferably connected to the base platform 18 via submersible lock winches 38 allowing the adjustment of active line lengths, thus changing the operating depth of the device. Winches 38 can also be locked for high holding capacity during operation. Suitable anchors 40 include a direct embedment anchor, a vertical load anchor, a suction anchor, a driven pile or micro pile anchor or a gravity anchor etc.

To enable efficient power extraction, the primary task of the base platform 18 is to provide the counter force for the double acting hydraulic cylinder 14 PTO units attached to it. In this embodiment, while positive PTO forces (e.g. positive heave, PTO extension) are guided along the shortest path into the taut mooring lines 24 and anchors 30, the negative PTO counter forces (PTO compression) are provided by the net positive buoyancy from the platform's integrated ballast tanks 16a, 16b, ultimately enabling double acting power extraction. Shadowed by the absorber body 12, the platform 18 operates deeper and is designed to show minimal hydrodynamic response to the occurring wave spectrum. Hence, wave excitation forces acting on the base platform 18 may be orders of magnitude smaller than for the absorber body 12 in any degree of freedom.

The forces of the hydraulic cylinders 14 on the base platform 18 have vertical and horizontal components. The hydraulic cylinders 14 are mounted to face each other in a way that a positive horizontal force vector of a front hydraulic cylinder opposes the negative horizontal force vector of a back hydraulic cylinder. Residual horizontal forces can be transferred through the angled taut mooring lines 24 into the anchors 40 and the ocean floor. Positive vertical force vectors induced by the cylinders 14 on the platform 18 are also transferred through the taut mooring lines 24 into the anchors 40. Negative vertical force vectors induced by the cylinder 14 on the platform 18 are opposed by the positive vertical force caused by buoyancy created by the ballast system 16a, 16b of the platform 18.

The volume of the ballast system 16a, 16b is preferably designed in a way that the highest negative vertical force, wave and PTO induced moments in all directions on the base platform 18 does not excite a positive vertical force ensuring the taut mooring lines 24 stay taut at all times to prevent snapping loads caused by a slack taut mooring line 24.

Positive and negative moments on the platform 18 created by cylinder induced loads with a lever from the neutral axis of the platform are also compensated through the taut mooring lines 24 into the anchors 40 as well as the distributed positive load of the buoyancy.

Relative motion between the absorber 12 and the base platform 18 results in the conversion of mechanical to hydraulic energy through the PTO units 14 which charge a closed-loop hydraulic circuit. The hydraulic circuit is housed in an isolated chamber 28 that is integrated into the platform 18 and is accessible during maintenance through a hatch integrated in the absorber 12 that can be opened and passed when locked to the base platform 18 to access the chamber.

The generated hydraulic flow at the given operating pressure inside each cylinder 14 may be rectified with hydraulic check valves that feed into a closed loop hydraulic circuit and the pressurized fluid is collected in an accumulator bank 28. Since the time-series of the flow that is generated by the cylinders is directly coupled to the sum of the relative displacement of the cylinder pistons 14, the produced flow fluctuates similar to the irregular motion of the absorber induced by the irregular motion of the ocean. The primary function of the accumulators 28 is to smooth out this irregular flow to a steady flow at set operating pressure. A secondary function of the accumulators 28 is to temporarily store the mechanical power as energy in the form of pressurized fluid.

In the circuit shown in FIG. 2A and FIG. 2B, the irregular hydraulic fluid flow is preferably rectified through check valves and the variable PTO cylinder 14 flow is smoothened using a bank of hydraulic accumulators 28. The accumulators 28 maintain a constant system pressure difference between the high side before the motor and the low pressure side using a reservoir before back feeding the cylinders that is then used to drive hydraulic motor 32 and mechanically coupled consumer 34 such as a generator or pump, thereby converting hydraulic flow into mechanical torque and ultimately electricity or flow of a different fluid such as ambient sea water in the final conversion step. An umbilical cable 26 may be used to transfer electricity to the shore and grid. In another embodiment, pressurized fluid is transported to the shore where it can perform work such as generating electricity.

The accumulators 28 maintain a constant system pressure that is then used to drive hydraulic motor 32 and generator 34. The accumulators 28 also include a control system with a processor and programming that is configured to monitor and control hydraulic system pressures and power generation. In one embodiment, the control system also monitors and controls the absorber load through aperture, hydraulic pressure and winch control. The controller may also monitor resonance and overall apparatus buoyancy.

Turning now to FIG. 3, the position of the apparatus in the water column can be controlled to both avoid sudden, extreme spikes in structural loads as well as to optimize energy harvesting conditions. Given the complex interactions and changing requirements for ideal energy harvesting, the apparatus design incorporates a means for adjusting to changing wave conditions and to handle sudden, extreme load spikes. The system preferably includes several redundant, independent, mechanisms for managing the highly variable loading imposed on the apparatus at several time scales by changing sea states, superposition of waves, and the relative position of the apparatus.

The apparatus design has three main control mechanisms to manage loads: 1) through apertures in the absorber body; 2) control over settings of the damping and restoring elements of the Power Conversion Chain system; and 3) control over the device operating depth.

The first load control mechanism is the presence of one or more absorber body apertures 30 in the absorber 12. The motive force created on the absorber 12 is principally due to the locally-varying and time-varying propagating pressure field differences between the regions above and below the absorber. These pressure differences exist only because of the separation imposed by the absorber. Locally canceling this pressure difference, for example by means of controlled apertures 30 in the absorber 12, can effectively and substantially reduce the overall structural load on the absorber 12, and thus also on the supporting structural elements of the apparatus. Active aperture 30 closures include controlled rotary closures or linear closure mechanisms. In addition to actively controlled apertures, passively controlled apertures 30 can be used that activate like a check valve once a set pressure difference is exceeded. Passive and active mechanisms can be implemented in the same aperture mechanism or independently.

By varying coverage of at least one aperture 30 embedded in the absorber 12, the pressure differential can be effectively short-cut with varying intensity. Through immediate and active control of one or more apertures in the absorber body, the body hydrodynamics can be tuned to maximize performance in a given sea state. Additionally, this load control strategy, implemented in the primary conversion stage, allows for lean apparatus body designs and device components by allowing load bearing elements to be sized for the energy absorbing operating states, rather than by storm conditions. Moreover, this control mechanism enables effective wave energy absorption for variable significant wave height. By actively controlling the active area of the absorber 12 through actuation of such control apertures 30, the apparatus can achieve improved performance without the accompanying risk of overload conditions and peak loads.

The second load control mechanism is through control of the power take off units. The control over the hydraulic fluid flow using a combination of check valves and actively controlled solenoid valves, proportional valves and an accumulator bank allows the system to maintain and control constant pressures and thus constant cylinder damping forces. The two chambers of a hydraulic cylinder can be directly shortcut leading to a fast reduction of damping force on the shaft and absorber.

A scheme where multiple discrete pressure levels can be achieved to approximate linear damping force characteristics that are proportional to cylinder velocity may be achieved by using accumulators at different pre-charge pressure levels. This allows damping of all four cylinders to be controlled independently while centralized hydraulic components are still shared. Alternatively, linear damping force characteristics can be approximated with a single centralized accumulator pressure and varying active hydraulic cylinder piston area in each PTO.

In addition to its load control capabilities, an inherent advantage of the design is its "passive PTO control" capability. In the embodiment shown in FIG. 1A, as waves excite the absorber body 12, the constrained kinematics of the device setup inherently alter the hydraulic cylinder 14 angles and thus, restoring force (k) and damping properties (c) in each of the main degrees of freedom. This nonlinear effect facilitates a self-adapting device response over a broad wave frequency and height spectrum. This change in damping and restoring forces during one closed absorber oscillation cycle can be specifically designed to contribute to the efficient operation of the apparatus.

The third load control mechanism is the control over the apparatus operating depth. The time-varying pressure differentials which create the motive force on the absorber body 12 decreases in amplitude with increasing water depth. Thus, an absorber 12 that is lower in the water column will experience lower overall structural loads compared to the same absorber configuration higher in the water column as seen in FIG. 3. The system maintains the ability to adjust its operating depth. Controllable operating depth is thus an important parameter to the system for load management.

The base platform 18 is connected to the mooring lines via four submersible lock winches 38, each of which can operate independently on its associated mooring line. The winches enable the platform to be pulled into an operating location while reduced positive buoyancy is set. Once in place, the winches lock and significantly increase their holding capacity. A ballasting system in the platform body 18 is adjusted to secure tension in the taut moorings 24 at all times while mooring winches 38 on the platform 18 frame are used to equalize tension among mooring lines and to change operating depth during operations, deployment, maintenance, and recovery.

In one embodiment, the apparatus also has a global positioning system (GPS) and a satellite communications link. The apparatus controller with a processor and programming monitors the apparatus sensors and controls the operating conditions of the apparatus and communicates with a land base. The satellite communication of inputs can be bi-directional. The controller sends a data set of all collected input and planned output information at the respective time stamp through the same channel as the satellite communication input.

For example, the controller can receive real time input information and data from sensor measurements, an apparatus performance database, SCADA system data and satellite communications. The SCADA system data may include: 1) wave data from local measurement buoys; 2) absolute position, velocity, and acceleration data from one or more Inertial Measurement Units (IMU) located in the absorber 12 and base structures 18 and 3) structural monitoring data from strain or deformation sensors installed on load-bearing elements within the apparatus structure. An apparatus performance data base may receive the same data and provides the respective values to the controller. The real-time data sets may be complemented with information from satellite communications that can include additional environmental and weather data as well as general control information from a remote control station. The transfer of this data may be accomplished through a direct cable integrated in the umbilical 26 to the substation on the ocean surface or floor where further distribution to shore or satellite communication is facilitated.

In one embodiment, sensor measurements are obtained from many different system monitoring sensors including: 1) PTO P(i) damper position measurements; 2) PTO P(i) force measurements; 3) accumulator A(i) state measurements; 4) motor M(i) Torque measurement; 5) generator G(i) power, voltage, current measurements; 6) mooring T(i) winch measurements; 7) ballast chamber B(i) measurements: 8) platform depth measurements; and 9) Environmental fluid pressure sensor PS(i) measurements.

Based on the controller inputs, the controller in this embodiment provides real time set values as outputs to various control elements including: 1) damping P(i) coefficient control; 2) stiffness P(i) coefficient control; 3) motor/generator control; 4) mooring T(i) winch control; 5) ballast chamber B(i) control and 6) aperture N(i) control. The Aperture N(i) controllers can also receive direct input from environmental fluid pressure sensors PS(i).

These mechanisms allow highly responsive mitigation of extreme loads and peak stress during storm events, for example. During normal operating conditions, these features can also be used to optimize the performance of the wave energy converter apparatus when integrated with predictive wave forecasting and real time sensor technology. In order to execute this operating strategy, passive and active mechanisms are used.

During an extreme event, for example, each device can be lowered down with the mooring winches to the required safety operating depth for that event, and, in parallel, the system can: 1) reduce the damping coefficient of the damping elements 14 leading to a decreased load on the frame; 2) apply the safety mechanism of latching the absorber platform 12 to frame to immobilize the absorber if it becomes necessary; 3) the passive safety apertures 30 can decrease excitation force if selected local overpressure is excited; 4) opening the active safety apertures; 5) setting the restoring elements such as the air springs into detune with the resonance frequency; and 6) orienting the absorber to decrease the wave excitation load.

For example, when the force measurement on every PTO P(i) exceeds a threshold value, the damping coefficient can be set to its minimum resulting in a rapid reduction of load inside the damping element and thus, on the absorber. In the case where the damping element is a cylinder, a direct shortcut between the two cylinder chambers via check valves can be used, where the check valves act as a parallel independent passive load measurement mechanism and volume differences of a single rod cylinder can be compensated with an accumulator.

One or multiple aperture overpressure mechanisms may also be embedded into the absorber. Activated, they allow a direct pressure exchange between the body of fluid above and underneath the absorber 12. Different cracking pressures can be set for different units. No input from active pressure sensors PS(i) is required in one embodiment.

Accordingly, the submerged pressure-differential design and the accompanying load management system allow for operation within specified limits to balance energy capture with possibly damaging loads throughout the life of the apparatus.

For load mitigation and management purposes winches and the aperture mechanisms represent similar and thus redundant systems which can be used to compensate a failure of one or the other system. In the case of a loss of functionality of the aperture load management system, the apparatus can be winched down and the capabilities for reduced operation can then be assessed. In the case of loss of a mooring winch 38 the apparatus can still be brought to the surface by winching the remaining systems and pivoting around the mooring point associated with the failed winch. In the case of failure of two diagonal winch systems, the buoyancy of the base platform 18 can be reduced to a minimum, winch locks are broken or the mooring line 24 is disconnected from its anchor and the device floats to the surface. In the event of the ballast system 16a, 16b is unable to reduce the buoyancy of the apparatus, mooring winches 38 can be used to bring the apparatus back to the surface. The ballast system of the apparatus is designed to never result in net-negative buoyancy and therefore the apparatus is always recoverable.

One response to the loss of a hydraulic cylinder is to switch the apparatus from operating to idle mode. The absorber aperture 30 can be fully opened as a safety mechanism to effectively mitigate wave excitation load. The positive buoyancy of the platform 18 can be adjusted using the ballast system tanks 16a, 16b to reduce mean mooring line tension. If required, operating depth reduction can be executed to further reduce wave excitation loads. If a non-functional cylinder allows the system is set into idle mode, the absorber 12 and base platform 18 can be mechanically locked which stops the energy input into the cylinders preventing further damage. The damaged cylinder can be disconnected from the joints and replaced during a maintenance procedure.

The movements of the absorber 12 and hydraulic cylinders 14 as a result of heave, surge and pitch wave actions are illustrated in FIG. 4A to FIG. 4D. As a result of the apparatus configuration, every positive and negative motion of the absorber 12 in any degree of freedom leads to relative motion between the absorber 12 and the base platform 18. This relative motion leads to a relative motion between the cylinder shafts and the cylinder housing, respectively, resulting into a displacement of the fluid inside the cylinder chamber in a double acting reciprocating motion.

Figure 4A:
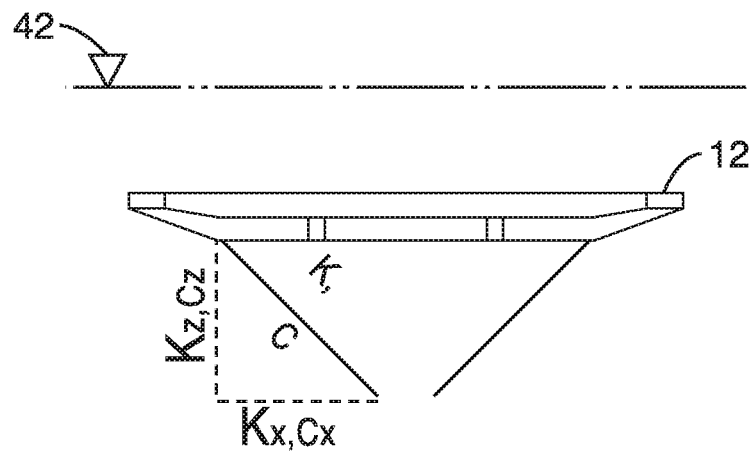
FIG. 4A is a schematic view of an absorber and power take off units at rest according to the technology.

FIG. 4A schematically illustrates the state of the absorber 12 returned to a resting state of the power take off units of the apparatus by the restoring force component (e.g. a mechanical spring, air spring or virtual spring). The absorber is essentially parallel with the surface 42 of the water and the cylinders 14 are not compressed.

Figure 4B:
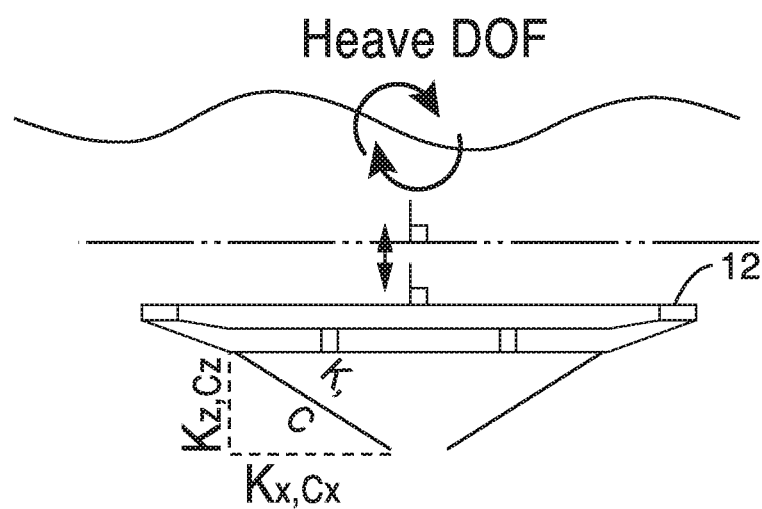
FIG. 4B is a schematic view of an absorber and the extension or compression of power take off units encountering heave forces according to the technology.

The vertical forces or heave that can be exerted on the absorber 12 are illustrated in FIG. 4B. The heave forces cause the absorber 12 to move up and down and the displacement of each of the cylinders 14 is essentially the same.

Figure 4C:
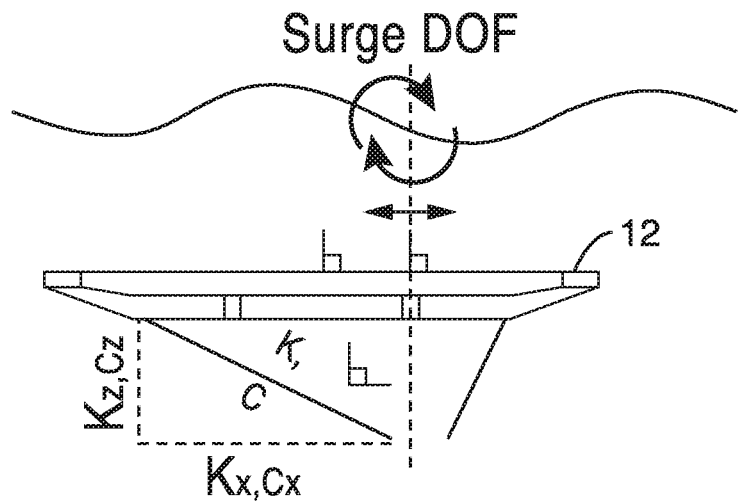
FIG. 4C is a schematic view of an absorber and the extension or compression of power take off units encountering surge forces according to the technology.

Horizontal forces known as surge forces exerted on the absorber 12 are shown in FIG. 4C. These forces cause forward and backward movements of the absorber 12 and corresponding extensions and compressions of the cylinders 14.

Figure 4D:
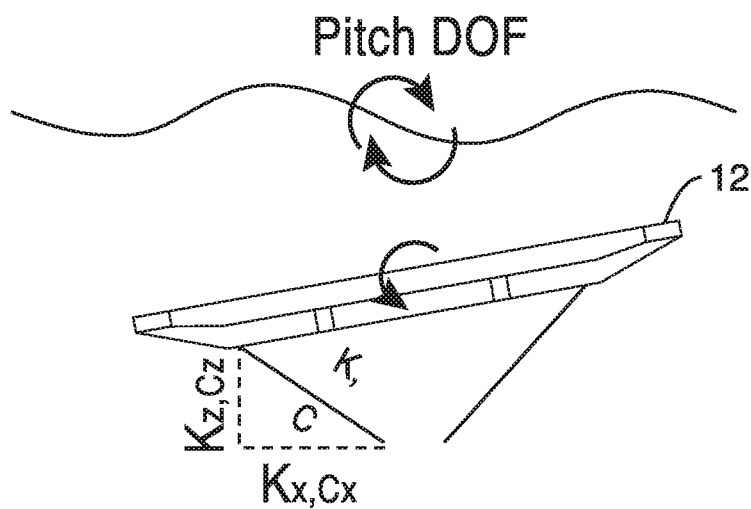
FIG. 4D is a schematic view of an absorber and the extension or compression of power take off units encountering pitch forces according to the technology.
Figure 5:
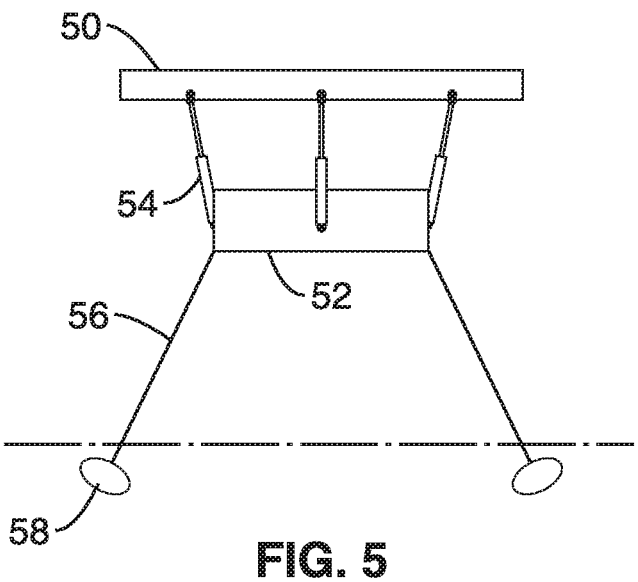
FIG. 5 is an alternative embodiment of a wave energy converter apparatus that has less than four power-take off units and mooring lines.

Pitch movements, that are the rotational motion around a lateral axis of the absorber 12, are illustrated in FIG. 4D. These movements of the absorber 12 will result in alternating compressions and extension of the cylinders 14.

The heave, surge, pitch and other motions of the absorber 12 are transferred to one or more power takeoff units, which transform the absorber motion into a standard form of mechanical power. A restoring force is in place to ensure the absorber oscillates about a set equilibrium.

The maximum energy extraction potential for any wave energy converter is achieved when the primary absorbing body's natural frequency matches the frequency of the principle energy-carrying component of the sea state spectrum at a given moment. This frequency matching is known as resonance.

In the embodiment of the system of FIG. 1A to FIG. 4D, the movements of the absorber body 12 are preferably in resonance with the current wave conditions. The natural frequency of absorber 12 is a function of the 1) the absorber's mass, 2) the absorber's buoyancy, 3) the restoring force of the power takeoff unit(s) attached to the absorber 12, 4) the power extracting characteristics of the power takeoff cylinders 14 attached to the absorber 12 (damping), and 5) the absorber's added mass. The added mass is itself a function of the absorber's depth and geometry, the latter component is dominated by the area normal to the absorber's motion.

Control of all these components may be coordinated to achieve resonance. The system can include several redundant, independent mechanisms for matching the response characteristics of the apparatus to ocean wave conditions. For example, the same controllable apertures 30 described above for load management will also affect the hydrodynamic added mass, and thus the natural frequency of the absorber, by changing the area of the absorber. The added mass is a function of depth as the ocean free surface interacts with the water displacement by the absorber's motion. Depth can be used as a parameter to change the added mass, and thus frequency, of the apparatus, and must also be considered in calculations to set other parameters for resonance control. The power takeoff units of the apparatus can also affect the natural frequency through both the restoring force component ("spring") and energy extraction component ("damper") regardless of their spatial orientation with respect to the absorber.

The dominant wave energy frequency conditions change continuously throughout the year and it is useful to tune the apparatus to achieve the optimum energy production from the system in a broad range of ocean conditions such as wave height, wave period and spectral shape. The system can be tuned, for example, by changing the operating depth and/or the aperture opening, hydrodynamic coefficients, especially added mass. The hydrodynamic tuning approach achieves resonance by choosing a set of nominal operating depth and aperture opening dimensions, leading to a hydrodynamic added mass which satisfies the resonance condition while avoiding loads above the design level. Precise device tuning is possible while the restoring force coefficient in the physical PTO can remain constant, enabling efficient energy capture in the sea states which contribute most to the annual energy production.

For severe storm conditions or harsh wave climates, which only insignificantly contribute to annual energy production, the optimization process described above is reversed. Exponential load decay with increasing apparatus depth is used for effective load mitigation. In addition, the apparatus is hydro-dynamically detuned from resonance by changing the absorber's added mass properties. This resonance detuning approach and exponential excitation load mitigation leads to effective load management by means of relatively small operating depth adjustments and absorber geometry changes.

It can be seen that the absorber and power take off linkage and functionality can be adapted to other base platform designs and alternative structures. For example, the base platform 52 can be moored to the ocean floor with three equally spaced mooring lines 56 and anchors 58. The base platform 52 is coupled to three double acting hydraulic cylinders 54 to the absorber 50 in the embodiment shown schematically in FIG. 5. Preferably, there are two downstream hydraulic cylinders 54 that are oriented diagonally outwards from the lower base platform 52 and connected via universal joints to the upper absorber body 50 and one upstream cylinder 54 is positioned in the geometric center of the base platform 52 in this embodiment. In addition, the taut mooring winches are preferably located at approximately the same mounting points as the cylinder joints on the platform body 52, resulting in the shortest possible force flow through the platform structure 52 from cylinder 54 to the mooring line 56.

In a two cylinder embodiment, one cylinder 54 connects to the absorber 50 and to the base platform 52 via joints that are located in the geometric center axis of both. Three taut mooring winches are used diagonally outwards providing stability of the platform in all directions.

In a one-cylinder embodiment, one cylinder connects to the absorber and to the base platform via a joint that is terminated at the geometric center of axis of both. This embodiment may be moored by one or more taut mooring lines, or one or more slack or catenary mooring lines.

Figure 6:
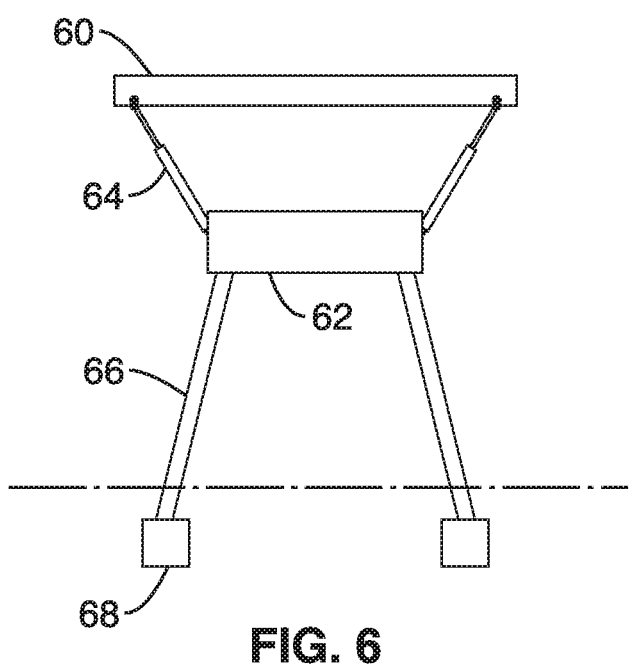
FIG. 6 is an alternative embodiment of a wave energy converter apparatus with tension leg mooring and reversibly coupled base.
Figure 7:
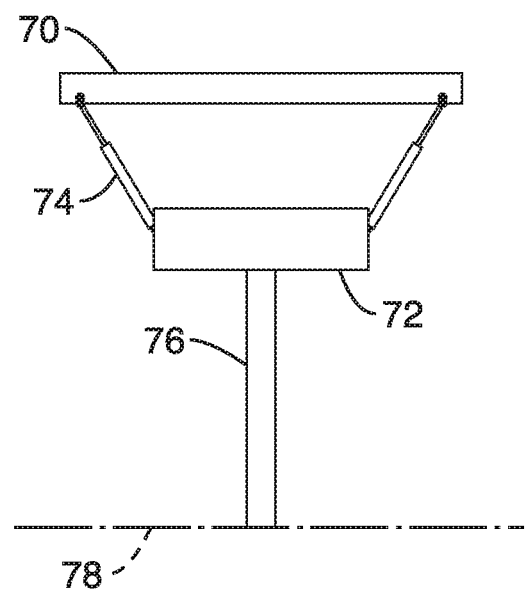
FIG. 7 is an alternative embodiment of a wave energy converter apparatus with a monopole or truss structure mooring and a reversibly coupled base.

In an alternative embodiment shown schematically in FIG. 6, the absorber 60 is coupled to the base platform 62 with two, three or four hydraulic cylinders 64. A Tension Leg Mooring (TLP) mooring 66 utilizing tendons connected to a mount 68 on the seafloor is used to provide stability to the platform 62 in all directions including positive and negative vertical loads. No buoyancy in the platform 62 is needed as the tendons can act in tension and compression. A mechanical link connects the TLP platform and the WEC platform 62, which is the mounting point for the cylinders 64, housing for power conversion chain and cable connections. The absorber 60 and base platform 62 can be disconnected from the TLP platform together for installation, maintenance and decommissioning in this embodiment.

One or multiple mono piles or truss structures 76 are used to provide stability to the platform 72 in all directions including positive and negative vertical loads. No buoyancy in the platform 72 is needed as the pile/truss 76 that is mounted to the sea floor 78 can act in both tension and compression conditions. In another embodiment, a mechanical link reversibly connects the mono pile platform and the WEC base platform 72 is used as the mounting point for cylinders, housing for the power conversion chain and cable connections. The absorber 70 and base platform 72 can be disconnected from the mono pile platform so that the apparatus can be maneuvered to and from the surface for installation, maintenance and decommissioning. No anchor is needed as the monopile 76 performs the function of an anchor.

Figure 8:
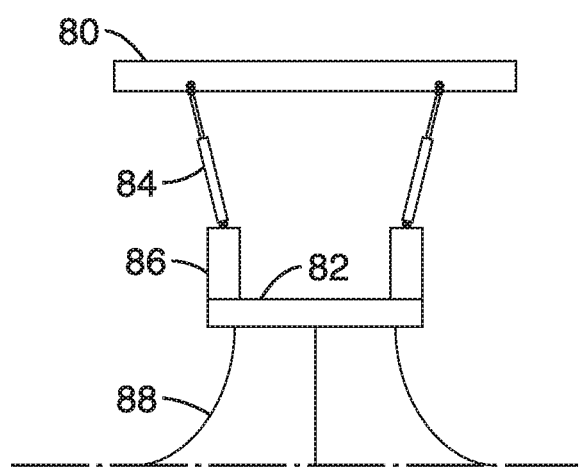
FIG. 8 is an alternative embodiment of a wave energy converter apparatus with a drag plate coupled to the base platform.

In a further embodiment shown schematically in FIG. 8, the absorber 80 is coupled to the buoyant elements of base platform 86 with cylinders 84 that are mounted along a center axis of the base elements. One or more drag plates 82 are connected to the base platform 86 increasing the hydrodynamic added mass of the platform 86. Three or more catenary mooring chains 88 are connected to the platform 86. The buoyant platform 86 rests in the mid water column in equilibrium between the weight of the chain and buoyancy. The mass and added mass inertia of the platform provide the reaction force to the cylinders 84 in operation. The mooring scheme also provides stability to the platform 86 in all directions including positive and negative vertical loads.

Embodiments of the present technology may be described herein with reference to flowchart illustrations of methods and systems according to embodiments of the technology, and/or procedures, algorithms, steps, operations, formulae, or other computational depictions, which may also be implemented as computer program products. In this regard, each block or step of a flowchart, and combinations of blocks (and/or steps) in a flowchart, as well as any procedure, algorithm, step, operation, formula, or computational depiction can be implemented by various means, such as hardware, firmware, and/or software including one or more computer program instructions embodied in computer-readable program code. As will be appreciated, any such computer program instructions may be executed by one or more computer processors, including without limitation a general purpose computer or special purpose computer, or other programmable processing apparatus to produce a machine, such that the computer program instructions which execute on the computer processor(s) or other programmable processing apparatus create means for implementing the function(s) specified.

Accordingly, blocks of the flowcharts, and procedures, algorithms, steps, operations, formulae, or computational depictions described herein support combinations of means for performing the specified function(s), combinations of steps for performing the specified function(s), and computer program instructions, such as embodied in computer-readable program code logic means, for performing the specified function(s). It will also be understood that each block of the flowchart illustrations, as well as any procedures, algorithms, steps, operations, formulae, or computational depictions and combinations thereof described herein, can be implemented by special purpose hardware-based computer systems which perform the specified function(s) or step(s), or combinations of special purpose hardware and computer-readable program code.

Furthermore, these computer program instructions, such as embodied in computer-readable program code, may also be stored in one or more computer-readable memory or memory devices that can direct a computer processor or other programmable processing apparatus to function in a particular manner, such that the instructions stored in the computer-readable memory or memory devices produce an article of manufacture including instruction means which implement the function specified in the block(s) of the flowchart(s). The computer program instructions may also be executed by a computer processor or other programmable processing apparatus to cause a series of operational steps to be performed on the computer processor or other programmable processing apparatus to produce a computer-implemented process such that the instructions which execute on the computer processor or other programmable processing apparatus provide steps for implementing the functions specified in the block(s) of the flowchart(s), procedure (s) algorithm(s), step(s), operation(s), formula(e), or computational depiction(s).

It will further be appreciated that the terms "programming" or "program executable" as used herein refer to one or more instructions that can be executed by one or more computer processors to perform one or more functions as described herein. The instructions can be embodied in software, in firmware, or in a combination of software and firmware. The instructions can be stored local to the device in non-transitory media, or can be stored remotely such as on a server, or all or a portion of the instructions can be stored locally and remotely. Instructions stored remotely can be downloaded (pushed) to the device by user initiation, or automatically based on one or more factors.

It will further be appreciated that as used herein, that the terms processor, hardware processor, computer processor, central processing unit (CPU), and computer are used synonymously to denote a device capable of executing the instructions and communicating with input/output interfaces and/or peripheral devices, and that the terms processor, hardware processor, computer processor, CPU, and computer are intended to encompass single or multiple devices, single core and multicore devices, and variations thereof.

From the description herein, it will be appreciated that that the present disclosure encompasses multiple embodiments which include, but are not limited to, the following:

1. A submerged wave energy converter apparatus, comprising: (a) a planar, horizontally oriented absorber body with an upper surface and a bottom surface; (b) a support base disposed beneath the bottom surface of the absorber body; (c) at least one damper coupled to the absorber body and to the support base, the damper configured to compress or expand with movement of the absorber body relative to the support base; (d) a linear motion energy converter connected to the damper; and (e) a restoring force mechanism configured to return a displaced absorber body to a set position; (f) wherein displacement of the absorber body relative to the support base in response to wave action and corresponding linear movement of the dampers actuates the linear motion energy converter.

2. The apparatus of any preceding embodiment, further comprising: a ballast system connected to the support base capable of increasing or decreasing buoyancy of the apparatus; and a mooring system coupled to the support base having a plurality of mooring lines.

3. The apparatus of any preceding embodiment, wherein the mooring lines are anchored with an anchor selected from the group of anchors consisting of a vertical load anchor, a dead-weight anchor and a direct embedment anchor.

4. The apparatus of any preceding embodiment, wherein the mooring system further comprises: a locking winch with a spool, gearbox and motor/generator coupled to each mooring line; and a winch controller.

5. The apparatus of any preceding embodiment, wherein the damper comprises: a cylinder with a piston; and a closed hydraulic system; wherein linear movement of the piston pressurizes fluid in the hydraulic system.

6. The apparatus of any preceding embodiment, wherein the hydraulic system further comprises: an accumulator bank; a hydraulic motor; and an electrical generator.

7. The apparatus of any preceding embodiment, wherein the linear motion energy converter comprises: a cylinder with an arm, an armature and a stator; wherein linear movement of the armature in relation to the stator generates electrical current.

8. The apparatus of any preceding embodiment, wherein the restoring force mechanism comprises a mechanism selected from the group of a mechanical spring, an air spring and a virtual spring.

9. The apparatus of any preceding embodiment, wherein the absorber body and the support base further comprises: a locking mechanism; wherein the absorber body and the support base are brought in close proximity and locked with the locking mechanism.

10. The apparatus of any preceding embodiment, wherein the absorber body further comprises at least one aperture and an aperture closure.

11. The apparatus of any preceding embodiment, further comprising: at least one pressure sensor mounted to the absorber body; and an overpressure controller operably coupled to the aperture closure configured to control closing and opening of the aperture closure.

12. A submerged wave energy converter apparatus, comprising: (a) a planar, horizontally oriented absorber body with an upper surface and a bottom surface, the absorber body having at least one aperture between the upper surface and bottom surface and an aperture closure; (b) a support base disposed beneath the bottom surface of the absorber body; (c) four hydraulic cylinders coupled to the absorber body and to the support base, the cylinders configured to compress or expand with movement of the absorber body relative to the support base; (d) a hydraulic system connected to each cylinder; and (e) a restoring force mechanism configured to return a displaced absorber body to a set position; (f) wherein displacement of the absorber body relative to the support base in response to wave action and corresponding linear movement of the cylinders pressurizes fluid in the hydraulic system; and (g) wherein the apparatus is able to extract energy from water waves by surge, heave, pitch, roll, yaw, and sway wave absorber excitation.

13. The apparatus of any preceding embodiment, further comprising: a ballast system connected to the support base capable of increasing or decreasing buoyancy of the apparatus; and a mooring system coupled to the support base having a plurality of mooring lines.

14. The apparatus of any preceding embodiment, wherein the mooring lines are anchored with an anchor selected from the group of anchors consisting of a vertical load anchor, a dead-weight anchor and a direct embedment anchor.

15. The apparatus of any preceding embodiment, wherein the mooring system further comprises: a locking winch with a spool, a gearbox and a motor/generator coupled to each mooring line; and a winch controller.

16. The apparatus of any preceding embodiment, wherein the hydraulic system further comprises: an accumulator bank; a hydraulic motor; and an electrical generator.

17. The apparatus of any preceding embodiment, wherein the restoring force mechanism comprises a mechanism selected from the group of a mechanical spring, an air spring and a virtual spring.

18. The apparatus of any preceding embodiment, wherein the absorber body and the support base further comprises: a locking mechanism; wherein the absorber body and the support base are brought in close proximity and locked with the locking mechanism.

19. The apparatus of any preceding embodiment, further comprising: (a) a controller with a processor; and (b) a non-transitory memory storing instructions executable by the processor; (c) wherein the instructions, when executed by the processor, perform steps comprising: (i) sensing an absorber body load with at least one pressure sensor; (ii) controlling the winch motor of the mooring system to govern the depth of the absorber body; (iii) controlling actuation of one or more aperture closures of the absorber body; and (iv) controlling the damping coefficient of the hydraulic cylinders to increase or decrease load on the absorber body; and (v) controlling buoyancy of the apparatus with the ballast system.

20. The apparatus of any preceding embodiment, wherein the instructions when executed by the processor further perform steps comprising: sensing damper position; measuring hydraulic system pressure; measuring hydraulic motor torque; measuring generator power, voltage and current output: and controlling output of the hydraulic motor.

Although the description herein contains many details, these should not be construed as limiting the scope of the disclosure but as merely providing illustrations of some of the presently preferred embodiments. Therefore, it will be appreciated that the scope of the disclosure fully encompasses other embodiments which may become obvious to those skilled in the art.

In the claims, reference to an element in the singular is not intended to mean "one and only one" unless explicitly so stated, but rather "one or more." All structural, chemical, and functional equivalents to the elements of the disclosed embodiments that are known to those of ordinary skill in the art are expressly incorporated herein by reference and are intended to be encompassed by the present claims. Furthermore, no element, component, or method step in the present disclosure is intended to be dedicated to the public regardless of whether the element, component, or method step is explicitly recited in the claims. No claim element herein is to be construed as a "means plus function" element unless the element is expressly recited using the phrase "means for". No claim element herein is to be construed as a "step plus function" element unless the element is expressly recited using the phrase "step for".

What is claimed is:

1. A submerged wave energy converter apparatus, comprising:
   a planar, horizontally oriented absorber body with an upper surface and a bottom surface, the absorber body comprising at least one aperture and an aperture closure;
   a support base disposed beneath the bottom surface of the absorber body;
   at least one damper coupled to the absorber body and to the support base, said damper configured to compress or expand with movement of the absorber body relative to the support base;
   a linear motion energy converter connected to the damper; and
   a restoring force mechanism configured to return a displaced absorber body to a set position;
   wherein displacement of the absorber body relative to the support base in response to wave action and corresponding linear movement of the dampers actuates the linear motion energy converter.

2. The apparatus of claim 1, further comprising:
a ballast system connected to the support base capable of increasing or decreasing buoyancy of the apparatus; and
a mooring system coupled to the support base having a plurality of mooring lines.

3. The apparatus of claim 2, wherein said mooring lines are anchored with an anchor selected from the group of anchors consisting of a vertical load anchor, a dead-weight anchor and a direct embedment anchor.

4. The apparatus of claim 1, wherein said damper comprises:
a cylinder with a piston; and
a closed hydraulic system;
wherein linear movement of the piston pressurizes fluid in the hydraulic system.

5. The apparatus of claim 1, wherein said restoring force mechanism comprises a spring.

6. The apparatus of claim 1, wherein said absorber body and said support base further comprises:
a locking mechanism;
wherein the absorber body and the support base are brought in close proximity and locked with the locking mechanism.

7. The apparatus of claim 1, further comprising:
at least one pressure sensor mounted to the absorber body; and
an overpressure controller operably coupled to the aperture closure configured to control closing and opening of the aperture closure.

8. A submerged wave energy converter apparatus, comprising:
a planar, horizontally oriented absorber body with an upper surface and a bottom surface, said absorber body having at least one aperture between the upper surface and bottom surface and an aperture closure;
a support base disposed beneath the bottom surface of the absorber body;
four hydraulic cylinders coupled to the absorber body and to the support base, said cylinders configured to compress or expand linearly with movement of the absorber body relative to the support base;
a hydraulic system connected to each cylinder;
a restoring force mechanism configured to return a displaced absorber body to a set position;
a controller with a processor; and
a non-transitory memory storing instructions executable by the processor;
wherein said instructions, when executed by the processor, perform steps comprising:
sensing an absorber body load with at least one pressure sensor,
controlling the winch motor of the mooring system to govern the depth of the absorber body,
controlling actuation of one or more aperture closures of the absorber body,
controlling the damping coefficient of the hydraulic cylinders to increase or decrease load on the absorber body, and
controlling buoyancy of the apparatus with the ballast system,
wherein displacement of the absorber body relative to the support base in response to wave action and corresponding linear movement of the cylinders pressurizes fluid in the hydraulic system; and
wherein the apparatus is able to extract energy from water waves by surge, heave, pitch, roll, yaw, and sway wave absorber excitation.

9. The apparatus of claim 8, further comprising:
a ballast system connected to the support base capable of increasing or decreasing buoyancy of the apparatus; and
a mooring system coupled to the support base having a plurality of mooring lines.

10. The apparatus of claim 9, wherein said mooring lines are anchored with an anchor selected from the group of anchors consisting of a vertical load anchor, a dead-weight anchor and a direct embedment anchor.

11. The apparatus of claim 9, wherein said mooring system further comprises:
a locking winch with a spool, a gearbox and a motor/generator coupled to each mooring line; and
a winch controller.

12. The apparatus of claim 8, wherein said hydraulic system further comprises:
an accumulator bank;
a hydraulic motor; and
an electrical generator.

13. The apparatus of claim 8, wherein said restoring force mechanism comprises a spring.

14. The apparatus of claim 8, wherein said absorber body and said support base further comprises:
a locking mechanism;
wherein the absorber body and the support base are bought in close proximity and locked with the locking mechanism.

15. The apparatus of claim 8, wherein said instructions when executed by the processor further perform steps comprising:
sensing damper position;
measuring hydraulic system pressure;
measuring hydraulic motor torque;
measuring generator power, voltage and current output; and
controlling output of the hydraulic motor.

* * * * *